United States Patent
Owaki

(10) Patent No.: US 12,422,284 B2
(45) Date of Patent: Sep. 23, 2025

(54) SENSOR MODULE

(71) Applicant: Sony Semiconductor Solutions Corporation, Kanagawa (JP)

(72) Inventor: Hirofumi Owaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 209 days.

(21) Appl. No.: 18/039,199

(22) PCT Filed: Nov. 10, 2021

(86) PCT No.: PCT/JP2021/041312
§ 371 (c)(1),
(2) Date: May 26, 2023

(87) PCT Pub. No.: WO2022/118621
PCT Pub. Date: Jun. 9, 2022

(65) Prior Publication Data
US 2024/0027236 A1      Jan. 25, 2024

(30) Foreign Application Priority Data
Dec. 4, 2020 (JP) .................................. 2020-202080

(51) Int. Cl.
*G01D 11/24* (2006.01)
*B29C 65/16* (2006.01)

(52) U.S. Cl.
CPC ........ *G01D 11/245* (2013.01); *B29C 65/1635* (2013.01)

(58) Field of Classification Search
CPC ........................... G01D 11/245; B29C 65/1635
See application file for complete search history.

(56) References Cited

U.S. PATENT DOCUMENTS

2005/0081990 A1    4/2005  Ruotsalainen
2008/0197314 A1*   8/2008  Bohlmann ......... F02M 63/0026
                                                  251/366
(Continued)

FOREIGN PATENT DOCUMENTS

DE    112021000982 T5 * 11/2022 ............. G03B 17/12
EP       3339929 A1    6/2018
(Continued)

OTHER PUBLICATIONS

International Written Opinion and English translation thereof mailed Dec. 7, 2021 in connection with International Application No. PCT/JP2021/041312.
(Continued)

*Primary Examiner* — Jamel E Williams
(74) *Attorney, Agent, or Firm* — Wolf, Greenfield & Sacks, P.C.

(57) ABSTRACT

[Object] To provide a sensor module and a method for producing the sensor module, the sensor module making it possible to improve a degree of freedom in design, to facilitate the operation, and to reduce costs by reducing the number of components.

[Solving Means] A sensor module according to an embodiment of the present technology includes a first member, a second member, a third member, and a sensor element. The first member is made of a synthetic resin material that has absorptive properties with respect to first laser light. The second member is made of a synthetic resin material that has transmissive properties with respect to second laser light of a wavelength that is different from a wavelength of the first laser light. The third member is made of a synthetic resin material that has transmissive properties with respect to the first laser light and has absorptive properties with respect to the second laser light, the third member including a first surface and a second surface, the first surface including a (Continued)

first welding portion that is welded to the first member, the second surface including a second welding portion that is welded to the second member.

10 Claims, 11 Drawing Sheets

(56) References Cited

U.S. PATENT DOCUMENTS

| | | | |
|---|---|---|---|
| 2019/0331984 A1 | | 10/2019 | Okamoto |
| 2020/0256088 A1* | | 8/2020 | Inuzuka ................ B23K 26/34 |

FOREIGN PATENT DOCUMENTS

| | | | | | |
|---|---|---|---|---|---|
| JP | 2007258316 A | * | 10/2007 | ......... | B29C 65/1635 |
| JP | 2007258877 A | * | 10/2007 | ......... | B29C 65/1635 |
| JP | 2018-202976 A | | 12/2018 | | |
| JP | 2019-188726 A | | 10/2019 | | |
| JP | 2020-044844 A | | 3/2020 | | |
| WO | WO 2018/123171 A1 | | 7/2018 | | |

OTHER PUBLICATIONS

International Preliminary Report on Patentability and English translation thereof mailed Jun. 15, 2023 in connection with International Application No. PCT/JP2021/041312.

Extended European Search Report issued May 6, 2024 in connection with European Application No. 21900376.1.

International Search Report and English translation thereof mailed Dec. 7, 2021 in connection with International Application No. PCT/JP2021/041312.

* cited by examiner

SENSOR MODULE

CROSS REFERENCE TO RELATED APPLICATIONS

This is a U.S. National Stage Application under 35 U.S.C. § 371, based on International Application No. PCT/JP2021/041312, filed Nov. 10, 2021, which claims priority to Japanese Patent Application JP 2020-202080, filed Dec. 4, 2020, each of which is hereby incorporated by reference in its entirety.

TECHNICAL FIELD

The present technology relates to a sensor module mounted on, for example, a vehicle.

BACKGROUND ART

A conventional camera unit used by being mounted on a vehicle is fastened by screwing to be fixed to a harness or a bracket that is attached to a vehicle body (for example, Patent Literature 1). Further, packing is put between the camera unit and the bracket (the harness) in order to prevent water from entering a vehicle, depending on the model of vehicle or the model of camera unit.

For example, Patent Literature 1 discloses, as this type of camera module, an apparatus that includes a housing formed by a front case and a rear case being joined to each other, a board that is arranged in the housing and includes an imaging device, a barrel member that is arranged between the imaging device and the front case, and a shield case that surrounds the board, the barrel member being fixed in the housing using a spring force of the shield case.

CITATION LIST

Patent Literature

Patent Literature 1: Japanese Patent Application Laid-open No. 2018-202976

DISCLOSURE OF INVENTION

Technical Problem

In the case of the conventional camera unit described above, there is a need to provide a space for a screw hollow and to perform attachment with a screw for packing. It is desirable that no space for a screw hollow be provided to increase a degree of freedom in design, fastening with a screw for packing not be performed to facilitate the operation (to improve the productivity), and production costs be reduced.

In view of the circumstances described above, it is an object of the present technology to provide a sensor module and a method for producing the sensor module, the sensor module making it possible to improve a degree of freedom in design, to facilitate the operation, and to reduce costs by reducing the number of components.

Solution to Problem

A sensor module according to an embodiment of the present technology includes a first member, a second member, a third member, and a sensor element.

The first member is made of a synthetic resin material that has absorptive properties with respect to first laser light.

The second member is made of a synthetic resin material that has transmissive properties with respect to second laser light of a wavelength that is different from a wavelength of the first laser light.

The third member is made of a synthetic resin material that has transmissive properties with respect to the first laser light and has absorptive properties with respect to the second laser light, the third member including a first surface and a second surface, the first surface including a first welding portion that is welded to the first member, the second surface including a second welding portion that is welded to the second member.

The first welding portion may be provided along a peripheral edge of the first surface, and the second welding portion may be provided along a peripheral edge of the second surface.

In this case, the first welding portion may be continuously provided along the peripheral edge of the first surface, or the second welding portion may be continuously provided along the peripheral edge of the second surface.

Alternatively, the first welding portion may be partially provided along the peripheral edge of the first surface, or the second welding portion may be partially provided along the peripheral edge of the second surface.

The first member may be a front case that accommodates therein the sensor element, the second member may be a harness that includes a cable that is electrically connected to the sensor element, and the third member may be a rear case that is connected between the front case and the harness.

Alternatively, the first member may be a front case that accommodates therein the sensor element, the second member may be a bracket used to fix the front case to a vehicle body, and the third member may be a rear case that is connected between the front case and the bracket.

Alternatively, the third member may be a front case that accommodates therein the sensor element, the front case including an opening at an end of the front case, and a through hole that is situated opposite to the end, the first member may be a rear case that is joined to the opening, and the second member may be a translucent protection cover that covers the through hole.

The sensor element may be, for example, an imaging device or a ranging sensor.

The first laser light may be laser light of a wavelength in an infrared band, and the second laser light may be laser light of a wavelength in a green band.

MODE(S) FOR CARRYING OUT THE INVENTION

Embodiments according to the present technology will now be described below with reference to the drawings.

First Embodiment

Figure 1:
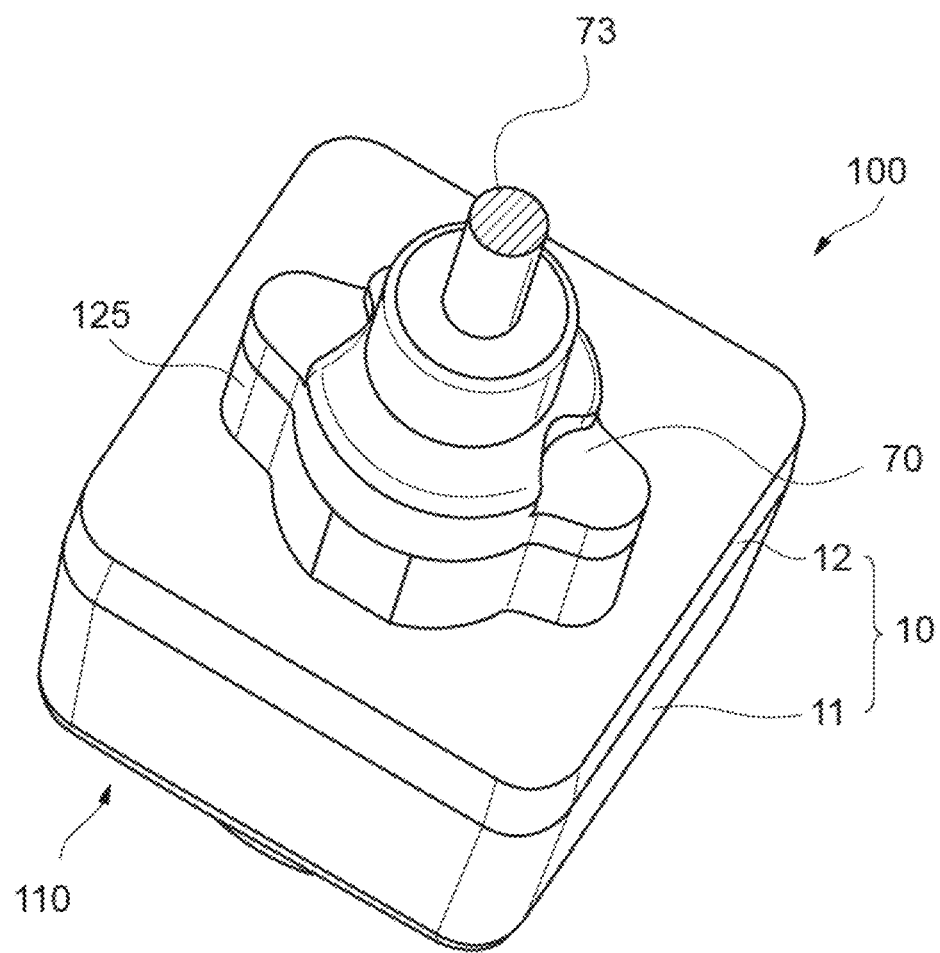
FIG. 1 is a rear perspective view illustrating a configuration of a sensor module according to a first embodiment of the present technology.

FIG. 1 is a perspective view illustrating a configuration of a sensor module 100 according to a first embodiment of the present technology. The sensor module 100 of the present embodiment is configured as a camera module used by being mounted on a vehicle.

The sensor module 100 can be attached to a vehicle. For example, the sensor module 100 is arranged outside of a vehicle body (an attachment target) (not illustrated), and captures an image of a region situated ahead of a vehicle, an image of a region situated behind the vehicle, or a region on a lateral side of the vehicle depending on an attachment position.

For example, the sensor module 100 attached to a front portion (for example, a radiator grill) of a vehicle body captures an image of an environment ahead of the vehicle. Further, the sensor module 100 attached to a rear portion (for example, above a license plate) of the vehicle body captures an image of an environment behind the vehicle. Furthermore, the sensor module 100 attached to a side portion of the vehicle (for example, an upper portion of a pillar (an A-pillar, a B-pillar, or a pillar (a C-pillar, a D-pillar) situated in a rearmost portion of the vehicle, or a sideview mirror) captures an image of an environment in a lateral direction of the vehicle.

[Overall Configuration of Sensor Module]

First, an overall configuration of the sensor module is described. As illustrated in FIG. 1, the sensor module 100 includes a camera unit 110 and a harness 70.

(Camera Unit)

Figure 2:
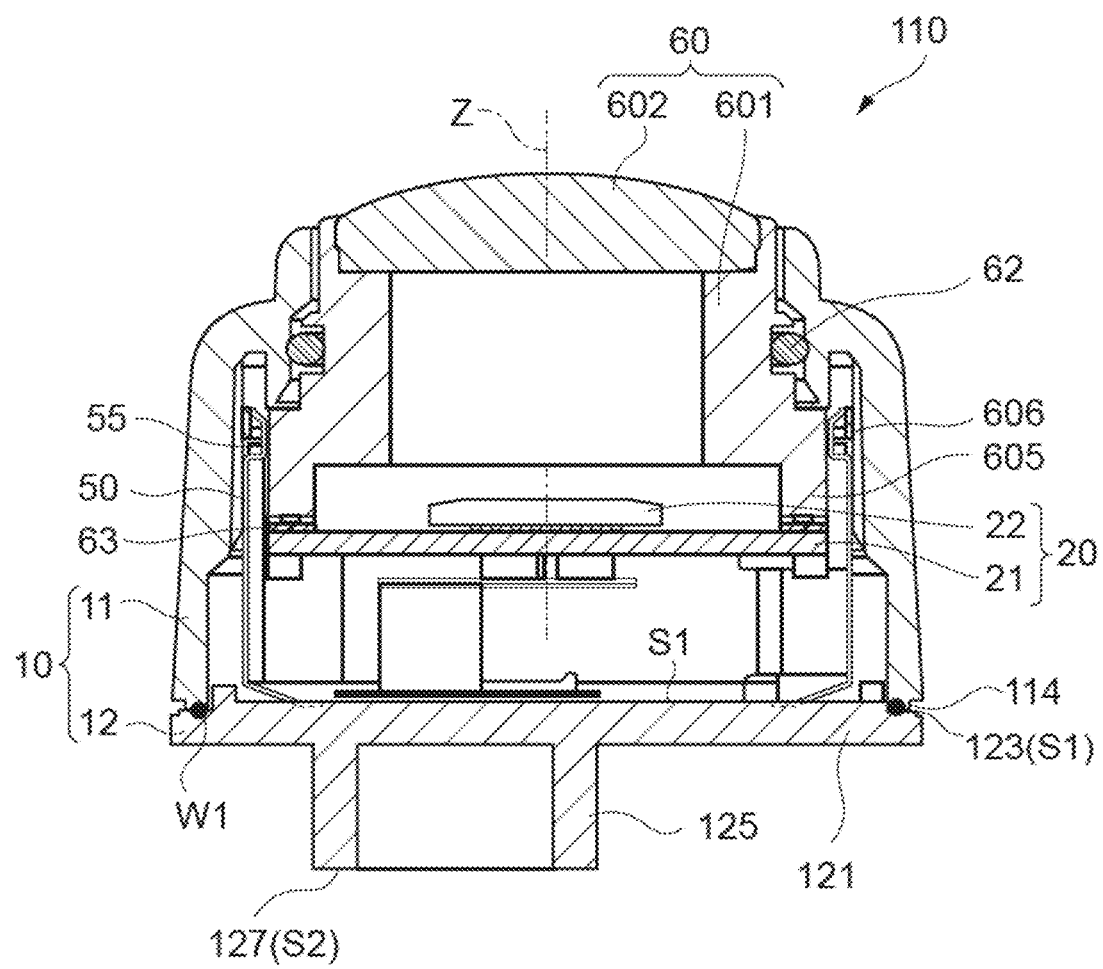
FIG. 2 is a schematic cross-sectional side view of a primary portion of the sensor module.

FIG. 2 is a cross-sectional side view of the camera unit 110. As illustrated in FIG. 2, the camera unit 110 of the present embodiment includes, for example, a housing 10, a sensor board 20, a shield case 50, and a barrel member 60.

The housing 10 is configured by a front case 11 and a rear case 12 being combined in a direction of an optical axis Z. Typically, the front case 11 and the rear case 12 are injection-molded bodies made of a synthetic resin material. The camera unit 110 is fixed to a vehicle body (not illustrated) through the harness 70 attached to the rear case 12.

Figure 3:
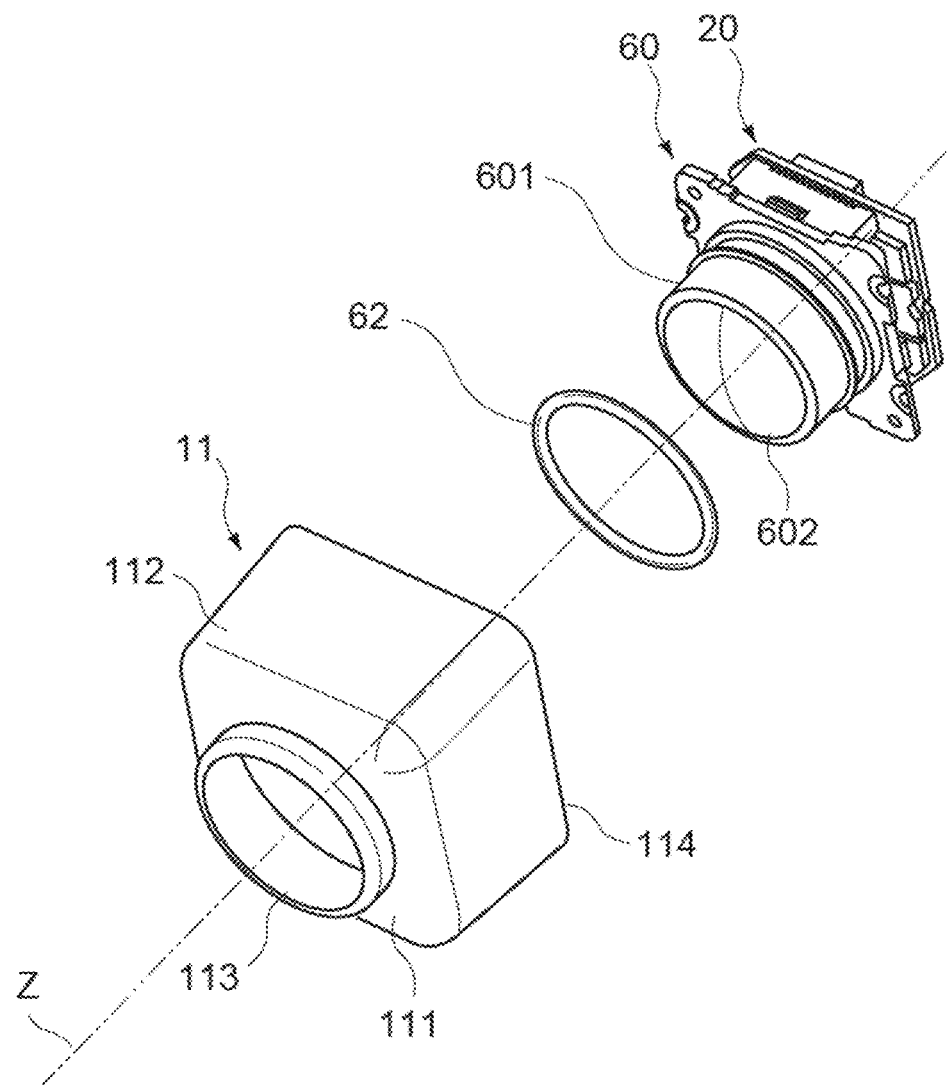
FIG. 3 is an exploded perspective view illustrating a relationship between a front case and a barrel member in the sensor module.
Figure 4:
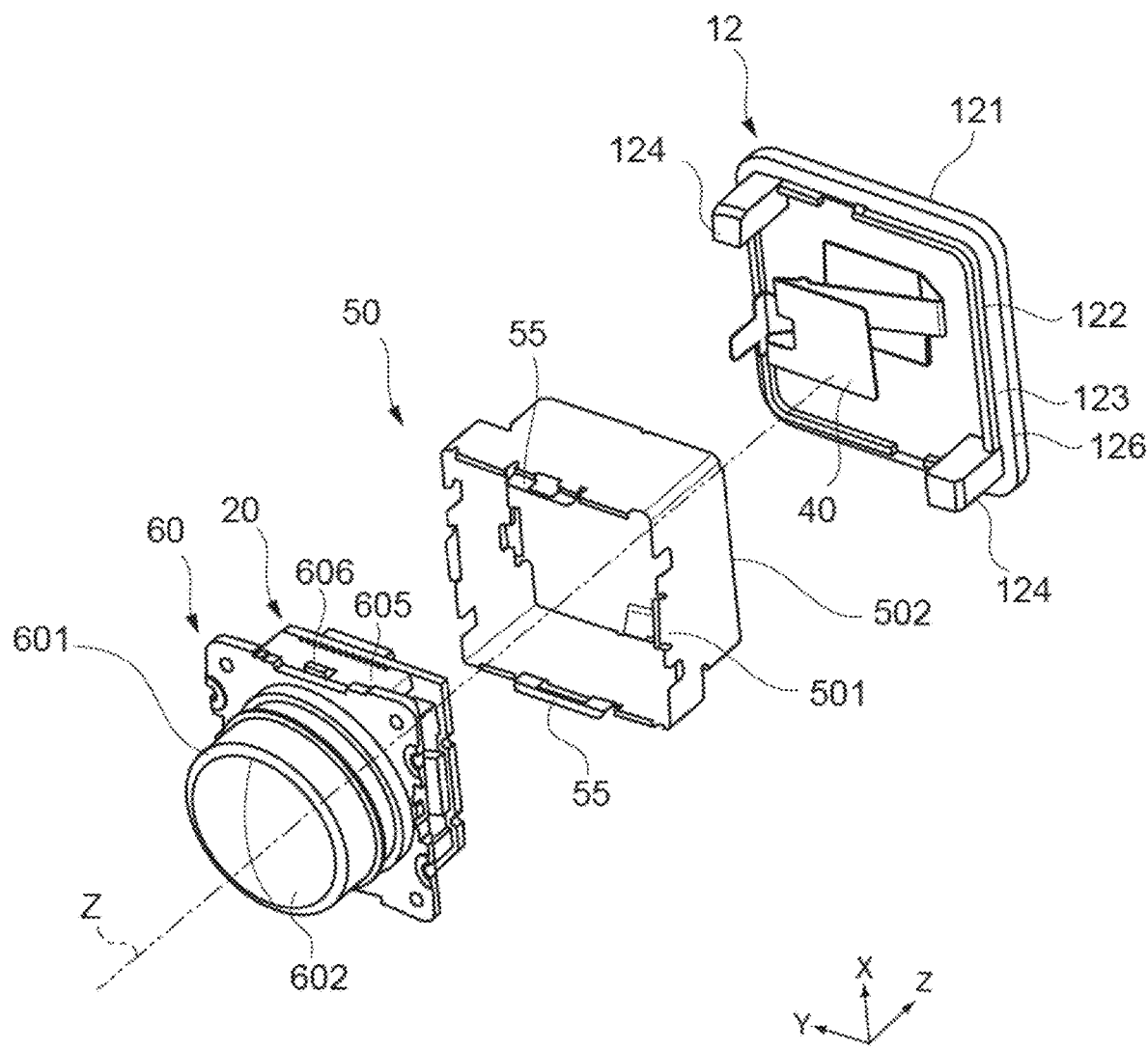
FIG. 4 is an exploded perspective view illustrating a relationship between the barrel member, a shield case, and a rear case in the sensor module.
Figure 5:
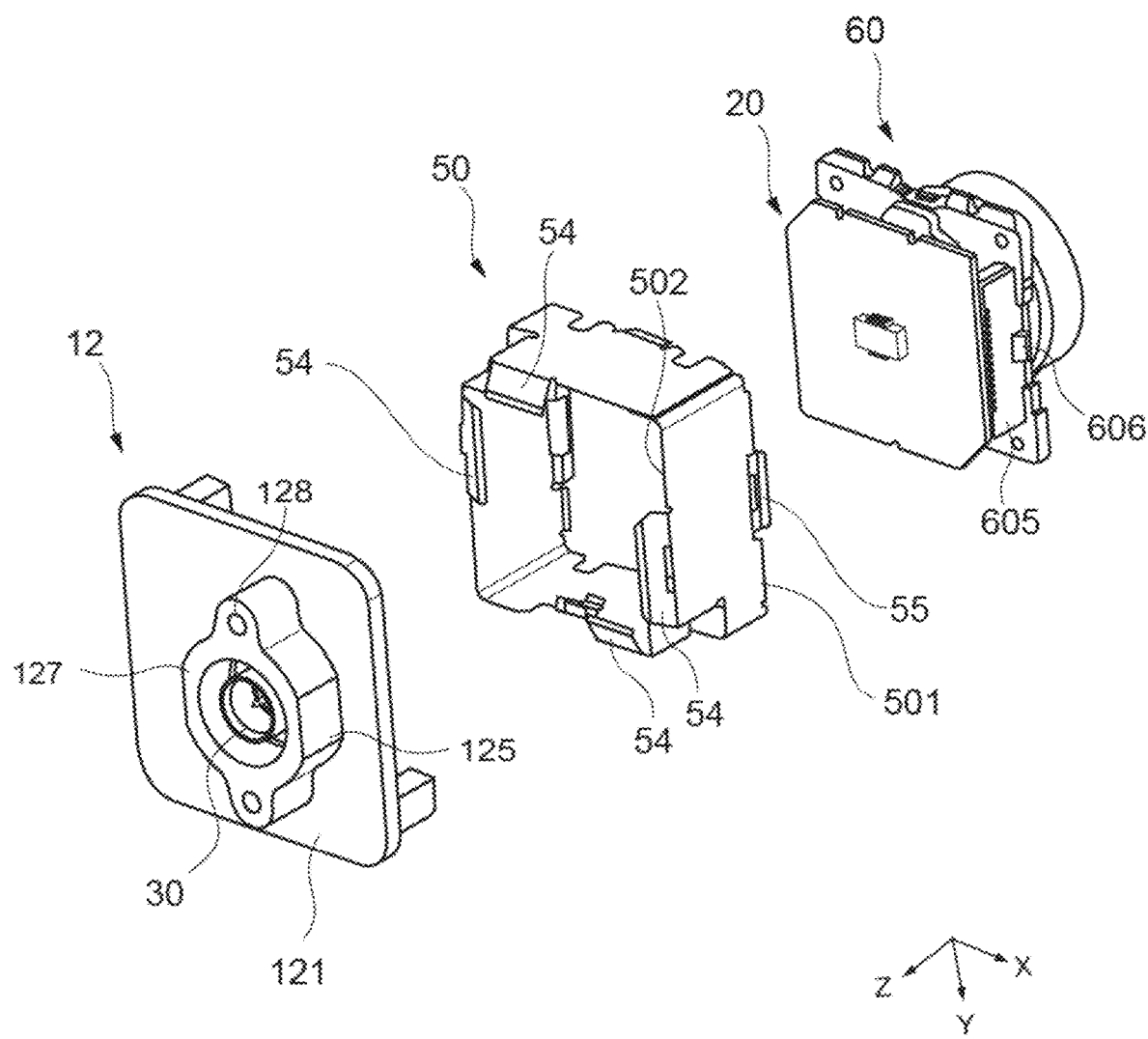
FIG. 5 is an exploded perspective view illustrating the relationship between the barrel member, the shield case, and the rear case in the sensor module.

FIG. 3 is an exploded perspective view illustrating a relationship between the front case 11 and the barrel member 60, and FIGS. 4 and 5 are exploded perspective views each illustrating a relationship between the barrel member 60, the shield case 50, and the rear case 12.

As illustrated in FIG. 3, the front case 11 includes a front surface portion 111 that is formed substantially orthogonal to the direction of the optical axis Z, and a lateral surface portion 112 that extends toward the rear case 12 from a peripheral edge of the front surface portion 111. In the present embodiment, the front surface portion 111 is substantially rectangular as viewed from the direction of the optical axis Z. The front case 11 is hollow, and a space portion that accommodates therein, for example, the sensor board 20, the shield case 50, and the barrel member 60 is formed in a region surrounded by the front surface portion 111 and the lateral surface portion 112.

The front case 11 includes an opening 113 at one of its ends, and an opening end 114 at another of its ends that is situated opposite to the one of its ends. The opening 113 is formed in a middle portion of the front surface portion 111. The opening end 114 is formed at an end of the lateral surface portion 112 that is situated on the side of the rear case 12. The opening end 114 is formed to be substantially rectangular correspondingly to an outer shape of the front surface portion 111. Note that the front surface portion 111 and the opening end 114 are not limited to being rectangular, and may be formed into another shape, such as a circular shape or a triangular shape.

The rear case 12 is fixed between the front case 11 and the harness 70. Further, as illustrated in FIG. 4, the rear case 12 includes a bottom surface portion 121 that is formed substantially orthogonal to the direction of the optical axis Z. The bottom surface portion 121 is formed into a generally rectangular plate shape. A substantially rectangular annular rib 122 is formed along a peripheral edge of the bottom surface portion 121. The annular rib 122 is provided near a peripheral edge of an inner surface (a surface that faces the front case 11) of the bottom surface portion 121. The annular rib 122 is fitted into an inner peripheral edge of the opening end 114, and partitions the peripheral edge of the inner surface of the bottom surface portion 121 to form a joining surface 123 that is joined to the opening end 114 of the front case 11. The front case 11 and the rear case 12 are integrated with each other by the opening end 114 being welded to the joining surface 123. A positioning protrusion 124 that is fitted into the opening end 114 is provided to each of two corners of the bottom surface portion 121 that are situated diagonal to each other.

Further, as illustrated in FIG. 5, an external connector 30 is provided on an outer surface of the bottom surface portion 121 of the rear case 12. The external connector 30 includes a signal terminal and a cylindrical ground terminal that surrounds the signal terminal. The external connector 30 is electrically connected to the sensor board 20 through the harness 70 and a flexible printed circuit (FPC) 40. This results in supplying power from a vehicle body to the sensor board 20, or in outputting an image signal from the sensor board 20 to the vehicle body.

On the other hand, as illustrated in FIG. 2, the barrel member 60 is arranged in the front case 11. The barrel member 60 includes a barrel 601 that is made of a synthetic resin and fitted into the opening 113 through a seal ring 62 (refer to FIGS. 2 and 3) in the direction of the optical axis Z. The barrel 601 is a cylindrical portion that supports an imaging lens 602, and protrudes forward of the front case 11 from the opening 113. A plurality of lenses is arranged in the barrel 601, although this is not illustrated.

The barrel member 60 further includes a pair of leg portions 605 joined to the sensor board 20. As illustrated in FIG. 2, leg portions 605 of the pair of leg portions 605 are plate walls that each extend in the direction of the optical axis Z. In the present embodiment, the leg portions 605 are provided such that a sensor element (an imaging device 22) is situated between the leg portions 605. Ends of the pair of leg portions 605 are fixed to the sensor board 20 through a joining member 63 such as an adhesive.

The front case 11 and the rear case 12 are connected to each other using laser welding, which will be described in detail later. This results in forming an internal space between the front case 11 and the rear case 12, the internal space accommodating therein, for example, the barrel member 60 and the sensor board 20.

The sensor board 20 is arranged in the camera unit 110. The sensor board 20 includes a board body 21, and the imaging device 22 being a sensor element and mounted on a front surface of the board body 21 that faces the barrel 601 (refer to FIG. 2).

The board body 21 is a rigid double-sided circuit board (a circuit board in which an electric circuit is formed on both a front surface and a back surface of the circuit board) such as a glass epoxy board. The board body 21 is not limited to being a single board as illustrated in the figures, and may be, for example, a board unit that includes a front board that faces the front surface portion 111 of the front case 11, a rear board that faces the bottom surface portion 121 of the rear case 12, and a spacer that is arranged between the front board and the rear board.

The imaging device 22 is an image sensor such as a complementary metal-oxide semiconductor (CMOS) image sensor or a charge coupled device (CCD) image sensor. The imaging device 22 is arranged to face the barrel 601, and includes an imaging surface at a position that corresponds to a focal position of the imaging lens 602. As described above, the board body 21 is fixed to the pair of leg portions 605 of the barrel member 60 through the joining member 63 (refer to FIG. 2).

Through the flexible printed circuit 40, the board body 21 is electrically connected to the external connector 30 provided to the rear case 12. The external connector 30 is used to electrically connect the sensor board 20 and a vehicle body through the harness 70. Through the external connector 30 and the harness 70, power is supplied from the vehicle body to the sensor board 20, and an image signal (an output signal of the imaging device 22) is transmitted from the sensor board 20 to the vehicle body.

A cylindrical portion 125 that is concentric with the external connector 30 is provided to the bottom surface portion 121 of the rear case 12 (refer to FIGS. 2 and 5). The cylindrical portion 125 is used to protect the external connector 30 from the outside, and is formed outside of the external connector 30 to be concentric with the external connector 30. Further, the cylindrical portion 125 includes a support surface 127 that is parallel to the bottom surface portion 121. The support surface 127 is formed to be a planar surface that supports the harness 70 (refer to FIG. 6).

The flexible printed circuit 40 electrically connects the sensor board 20 and the external connector 30. The flexible printed circuit 40 is a circuit board obtained by routing a signal line and a ground line on a flexible base material such as polyimide. The signal line is wiring that is electrically connected to the signal terminal of the external connector 30 and carries an image signal coming from the sensor board 20. The ground line is wiring that is electrically connected to the ground terminal of the external connector 30 to be connected to a ground line of the sensor board 20. When the sensor board 20 and the external connector 30 are connected to each other using the flexible printed circuit 40, this makes it possible to absorb variations (tolerances) in a distance between the sensor board 20 and the external connector 30, and thus to ensure the reliability in a stable electrical connection between them.

The shield case 50 is a substantially rectangular cylindrical body. The shield case 50 is typically made of a metallic material such as stainless steel, an aluminum alloy, or a copper alloy, and is one of components used for electromagnetic compatibility (EMC) measures taken to protect the sensor board 20 from electromagnetic noise. The shield case 50 is a press-molded body of a sheet metal made of the metallic material described above. The shield case 50 is arranged in the front case 11 to be situated between the barrel member 60 and the rear case 12.

The shield case 50 includes four lateral surfaces that cover around the sensor board 20 including the imaging device 22. The shield case 50 includes two ends that are a first end 501 and a second end 502 that face each other in the direction of the optical axis Z. An engagement portion 55 that is engaged with the barrel member 60 is provided to the first end 501, and an elastic portion 54 that is brought into elastic contact with the bottom surface portion 121 of the rear case 12 is provided to the second end 502.

The engagement portion 55 is provided to each of two facing sides of the first end 501, and includes a hole that is engaged with an engagement protrusion 606 of the barrel member 60 (refer to FIGS. 2, 4, and 5). The elastic portion 54 is formed by being bent inward of the shield case 50 from the second end 502 at a specified angle. The elastic portion 54 is provided to a plurality of locations at the second end 502. The elastic portion 54 is elastically deformed toward the front case 11 when the shield case 50 is accommodated in the housing 10, and biases the barrel member 60 (and the sensor board 20) toward the front surface portion 111 of the front case 11 using a reaction to the elastic force.

(Harness)

The harness 70 is attached to the camera unit 110, and electrically connects a power supply of a vehicle body and the camera unit 110. The harness 70 is fixed to the rear case 12 through a seal ring 74.

Figure 6:
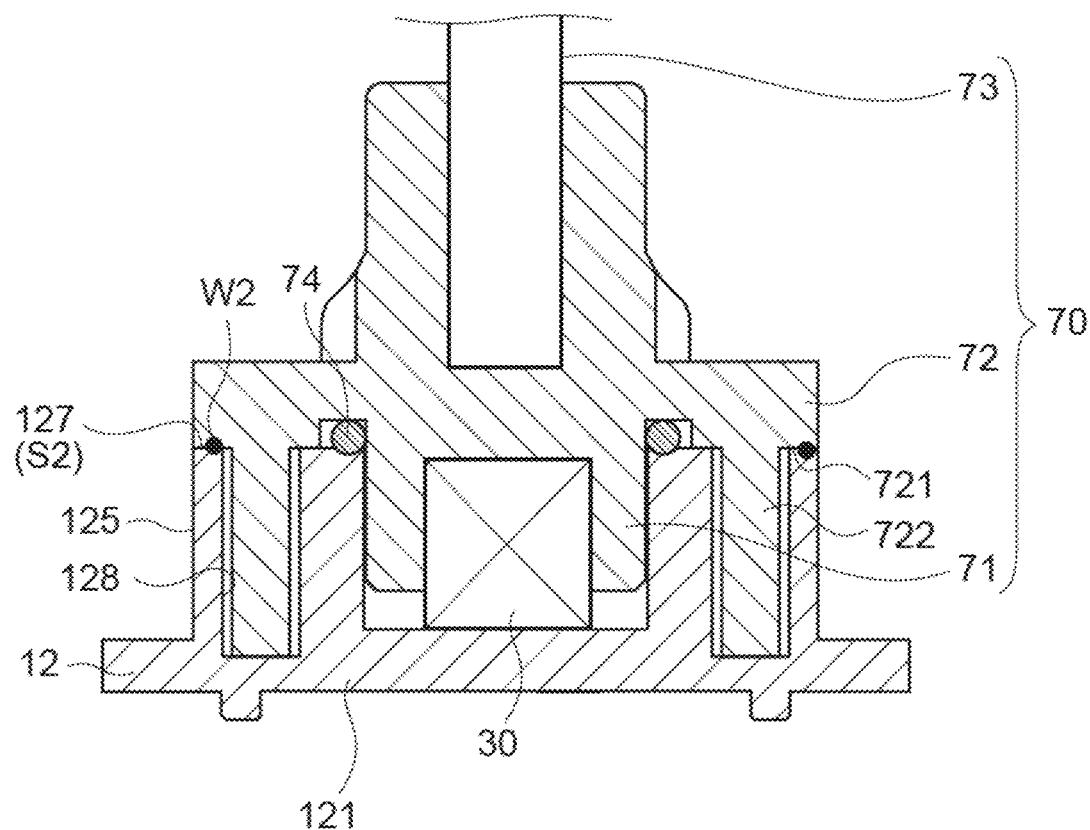
FIG. 6 is a schematic cross-sectional side view of another primary portion of the sensor module.

FIG. 6 is a schematic cross-sectional side view illustrating a state of connection between the harness 70 and the rear case 12. The harness 70 includes a terminal unit 71 that is connected to the external connector 30 of the rear case 12, a fixation section 72 that fixes the terminal unit 71 to the rear case 12, and a cable 73 that is electrically connected to the terminal unit 71. Note that FIG. 6 simply illustrates the external connector 30.

The terminal unit 71 includes a plurality of connection points (a plurality of connection holes) into which the signal terminal and the ground terminal of the external connector 30 are respectively fitted. The fixation section 72 is a plate that is made of a synthetic resin and provided around the terminal unit 71, and includes a joining surface 721 that faces the support surface 127 of the cylindrical portion 125 of the rear case 12, and a plurality of shaft portions 722 protruding toward the support surface 127 from the joining surface 721. Shaft portions 71 of the plurality of shaft portions 71 are each fitted into a hole 128 that is formed in the support surface 127. This results in the plurality of shaft portions 722 serving to determine a position of the harness 70 with respect to the rear case 12. Note that the shaft portion 722 and the hole 128 may be omitted as necessary. The cable 73 is a coaxial cable that includes a signal line connected to the signal terminal of the external connector 30, and a shield layer connected to the ground terminal of the external connector 30.

The seal ring 74 is arranged around the terminal unit 71 and situated between the fixation section 72 and the cylindrical portion 125 of the rear case 12. The seal ring 74 is used to secure waterproof properties and dustproof properties of a portion of connection between the terminal unit 71 and the external connector 30. As described later, the placement of the seal ring 74 may be omitted depending on how the rear case 12 and the harness 70 have been welded.

(Laser Welding Portion)

In the sensor module 100 of the present embodiment, the front case 11 and the rear case 12 are joined to each other using laser welding, and the rear case 12 and the harness 70 are joined to each other using laser welding.

The rear case 12 includes a first surface S1 that includes a first welding portion W1 that is welded to the front case 11, and a second surface S2 that includes a second welding portion W2 that is welded to the fixation section 72 of the harness 70. The first surface S1 corresponds to the joining surface 123 being included in the bottom surface portion 121 and facing the opening end 114 of the front case 11 (refer to FIG. 2), and the second surface S2 corresponds to the support surface 127 being included in the cylindrical portion 125 and facing the fixation section 72 of the harness 70 (refer to FIG. 6).

Figure 7:
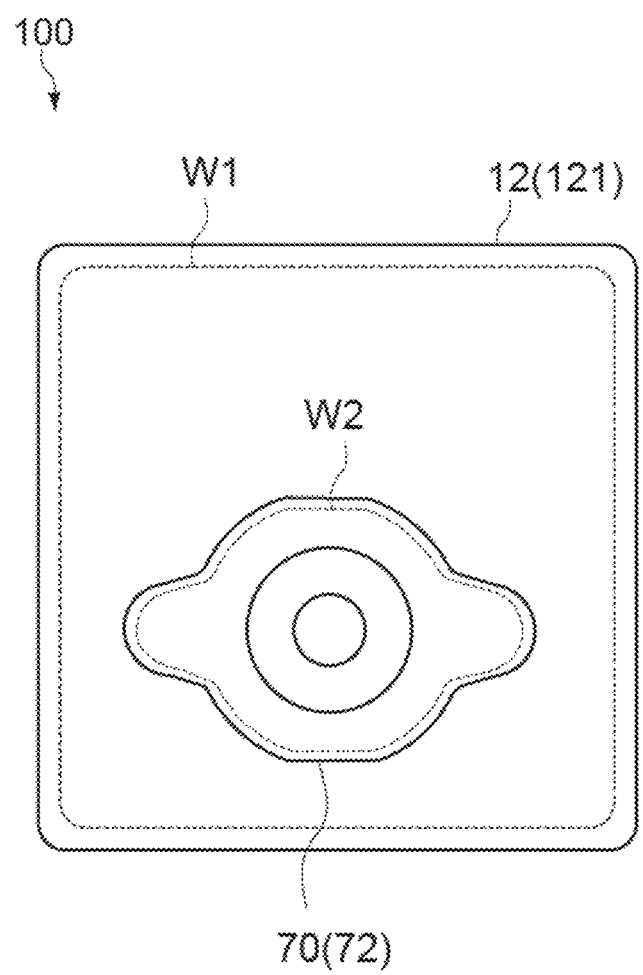
FIG. 7 is a schematic rear view of the sensor module that illustrates a relationship between a first welding portion and a second welding portion.

FIG. 7 illustrates a back surface of the sensor module 100, with the first welding portion W1 and the second welding portion W2 being viewed from the direction of the optical axis.

The first welding portion W1 is provided along a peripheral edge of the bottom surface portion 121 of the rear case 12. The first welding portion W1 is continuously provided along the peripheral edge of the bottom surface portion 121. However, without being limited thereto, the first welding portion W1 may be partially (intermittently) provided along the peripheral edge of the bottom surface portion 121. The first welding portion W1 is a melt-and-mixture portion of a resin material of the front case 11 and a resin material of the rear case 12 (indicated by a black circle in FIG. 2).

The second welding portion W2 is provided along a peripheral edge of the support surface 127 of the cylindrical portion 125 of the rear case 12. The second welding portion W2 is continuously provided along the peripheral edge of the support surface 127. However, without being limited thereto, the second welding portion W2 may be partially (intermittently) provided along the peripheral edge of the support surface 127. The second welding portion W2 is a melt-and-mixture portion of a resin material of the fixation section 72 of the harness 70 and a resin material of the rear case 12 (indicated by a black circle in FIG. 6).

As illustrated in FIG. 7, the first welding portion W1 and the second welding portion W2 are not formed at the same location as viewed from the direction of the optical axis, and the second welding portion W2 is formed further inward than the first welding portion W1. Since the first welding portion W1 and the second welding portion W2 are each annually continuously formed, sealing properties of the joining portion between the front case 11 and the rear case 12 and of the joining portion between the rear case 12 and the harness 70 are improved, and this results in securing waterproof properties and dustproof properties. In this case, the seal ring 74 placed between the rear case 12 and the harness 70 may be omitted.

Members that are the front case 11 and the rear case 12 are joined using laser welding, and members that are the harness 70 and the rear case 12 are joined using laser welding. Thus, the front case 11 (a first member) is made of a synthetic resin material that has absorptive properties with respect to first laser light, and the fixation section 72 (a second member) of the harness 70 is made of a synthetic resin material that has transmissive properties with respect to second laser light of a wavelength that is different from a wavelength of the first laser light. Further, the rear case 12 (a third member) is made of a synthetic resin material that has transmissive properties with respect to the first laser light and has absorptive properties with respect to the second laser light.

The first laser light is not particularly limited. For example, red laser light of a wavelength of from 800 nm to 1100 nm or laser light of a wavelength in an infrared band is used. With respect to a resin material having transmissive properties with respect to the first laser light, the transmittance of the resin material with respect to the first laser light is equal to or greater than 30%, and favorably equal to or greater than 40%.

Likewise, the second laser light is not particularly limited. The second laser light can be set discretionarily according to types of synthetic resin materials of the front case 11, the rear case 12, and the fixation section 72 of the harness 70. For example, when the wavelength of the first laser light is 1064 nm, laser light of a wavelength of 532 nm in a green band is used as the second laser light. In addition to the laser light in the green band, blue laser light or ultraviolet laser light may be used. With respect to a resin material having transmissive properties with respect to the second laser light, the transmittance of the resin material with respect to the second laser light is equal to or greater than 30%, and favorably equal to or greater than 40%.

For example, a polyamide (PA) resin, a styrene acrylonitrile (SAN) resin, a general-purpose resin such as an acrylonitrile-butadiene-styrene (ABS) resin, a polycarbonate (PC) resin, a polypropylene (PP) resin, a mixture resin of ABS and PC, a polybutylene terephthalate (PBT) resin, a polyacrylic (PAA) resin, or a fluororesin such as polytetrafluoroethylene (PTFE) is used as a resin material that has absorptive properties or transmissive properties with respect to laser light.

With respect to the absorptive properties with respect to laser light, the adjustment of a combination of an absorptive pigment and an absorptive dye that are mixed with a resin, or the adjustment of an additive amount of the absorptive pigment and the absorptive dye makes it possible to adjust the laser-light absorptance (or the laser-light transmittance) discretionarily. For example, carbon black that is an absorptive pigment can be used as an absorptive material. It is favorable that an absorptive dye be used as a coloring material. The adjustment of an additive amount of the absorptive material makes it possible to adjust the laser-light absorptance (or the laser-light transmittance) discretionarily.

It is favorable that the same type of matrix resin be used for a resin material having absorptive properties with respect to laser light and a resin material having transmissive properties with respect to the laser light. This results in increasing an affinity between resins situated at a joining portion and in enhancing the weld strength. The transmissive wavelength differs depending on resin. For example, the type or an additive amount of absorption pigment/dye is adjusted on the basis of a PA resin material. This makes it possible to give transmissive properties to laser light of one of two wavelengths, and to give absorptive properties to laser light of another of the two wavelengths.

Further, the laser-light transmittance differs depending on not only the type of resin but also a thickness of a resin. Thus, it is favorable that a region through which laser light is transmitted be thinner. Typically, the thickness of the region through which laser light is transmitted is smaller than or equal to 2 mm. In the present embodiment, a region through which the first laser light L1 is transmitted corresponds to the bottom surface portion 121 of the rear case 12, and a region through which the second laser light L2 is transmitted corresponds to the fixation section 72 of the harness 70.

[Method for Producing Sensor Module]

Next, a method for producing the sensor module 100 of the present embodiment having the configuration described above is described.

A method for producing the sensor module 100 according to the present embodiment includes accommodating a sensor element (the imaging device 22) in the front case 11, joining the joining surface 123 (the first surface S1) of the rear case 12 to the opening end 114 of the front case 11 using laser welding, and joining the bracket 70 to the support surface 127 (the second surface S2) of the rear case 12 using laser welding.

Figure 8:
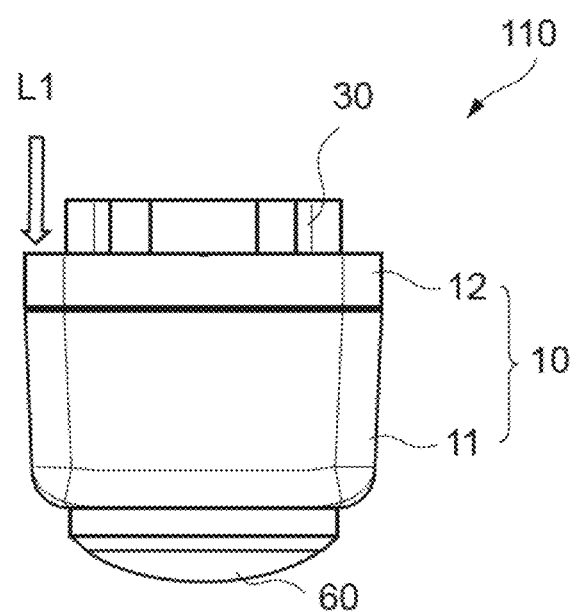
FIG. 8 is a set of schematic process diagrams used to describe a method for producing the sensor module.
Figure 8:
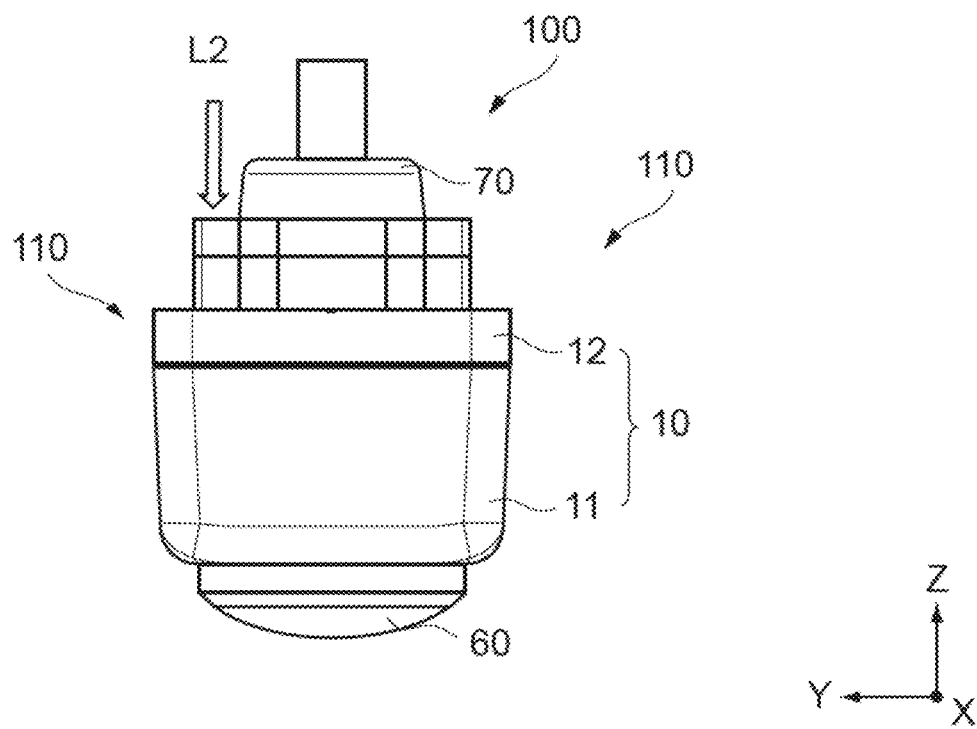

(A) and (B) of FIG. 8 are schematic process diagrams used to describe the method for producing the sensor module 100.

The shield case 50 is accommodated in the front case 11 in a state in which the engagement portion 55 of the first end 501 of the shield case 50 is engaged with the engagement protrusion 606 of the barrel member 60. Then, the front case 11 and the rear case 12 are assembled to each other in the Z-axis direction such that the opening end 114 of the front case 11 and the joining surface 123 (the first surface S1) of the rear case 12 face each other.

Subsequently, the first laser light L1 used for welding is irradiated toward the bottom surface portion 121 of the rear case 12 from a side of the back surface of the camera unit 110 (from a side of the outer surface of the rear case 12) in a state in which the rear case 12 is pressed against the front case 11 under a specified load, as illustrated in (A) of FIG. 8. Here, the first laser light L1 is irradiated onto a portion, in the outer surface of the rear case 12, that corresponds to the opening end 114 of the front case 11, and is scanned along the peripheral edge of the rear case 12. The first laser light L1 may be pulsed light or continuous light.

In the present embodiment, the front case 11 is made of a resin material that has absorptive properties with respect to the first laser light L1, and the rear case 12 is made of a resin material that has transmissive properties with respect to the first laser light L1. Thus, the first laser light L1 is transmitted through the rear case 12 to be irradiated onto the opening end 114 of the front case 11. A region, in the opening end 114, that is irradiated with the first laser light L1 generates heat due to absorption of the first laser light L1 to be partially melted.

On the other hand, the joining surface 123 (the first surface S1) being included in the rear case 12 and facing the opening end 114 is also partially melted due to heat transfer from a melted portion of the opening end 114. Thereafter, the melted portion of the opening end 114 and a melted portion of the joining surface 123 are cooled to be solidified, and the first welding portion W1 welded to the opening end 114 is formed on the joining surface 123 (the first surface S1) (refer to FIG. 2). This results in producing the camera unit 110 obtained by the front case 11 and the rear case 12 being integrally joined to each other.

Subsequently, as illustrated in (B) of FIG. 8, the camera unit 110 and the harness 70 are assembled to each other in the Z-axis direction in a state in which the orientation of the camera unit 110 in the up-and-down direction remains unchanged, such that the support surface 127 (the second surface S2) of the rear case 12 faces the fixation section 72 of the harness 70. Thereafter, the second laser light L2 used for welding is irradiated toward the support surface 127 of the rear case 12 from the side of the back surface of the camera unit 110 (from a side of the fixation section 72 of the harness 70) in a state in which the rear case 12 is pressed against the harness 70 under a specified load. Here, the second laser light L2 is irradiated onto a portion, in the fixation section 72 of the harness 70, that corresponds to the support surface 127 of the cylindrical portion 125 of the rear case 12, and is scanned along the peripheral edge of the rear case 12. The laser light L2 may be pulsed light or continuous light.

In the present embodiment, the fixation section 72 of the harness 70 is made of a resin material that has transmissive properties with respect to the second laser light L2. Thus, the second laser light L2 is transmitted through the fixation section 72 of the harness 70 to be irradiated onto the support surface 127 of the rear case 12. Further, the rear case 12 is made of a resin material that has absorptive properties with respect to the second laser light L2. Thus, a region, in the support surface 127 of the rear case 12, that is irradiated with the second laser light L2 generates heat due to absorption of the second laser light L2 to be partially melted.

On the other hand, the fixation section 72 being included in the harness 70 and facing the support surface 127 is also partially melted due to heat transfer from a melted portion of the support surface 127. Thereafter, the melted portion of the fixation section 72 and a melted portion of the support surface 127 are cooled to be solidified, and the second welding portion W2 welded to the fixation section 72 is formed on the support surface 127 (the second surface S2). This results in producing the sensor module 100 obtained by the camera unit 110 and the harness 70 being integrally joined to each other.

As described above, the rear case 12 is welded to the front case 11 and to the harness 70 using laser welding. Thus, according to the present embodiment, there is no need to provide a space for a screw hollow and to perform attachment with a screw for packing, compared to when a rear case and a front case are joined to each other using a screw. This makes it possible to improve a degree of freedom in design, to facilitate the operation, and to reduce costs by reducing the number of screw components. Further, the sensor module 100 can be made smaller in size since there is no need for a space for a screw hollow. Furthermore, a high-functionality large component (LSI) can be implemented since the internal space of the sensor module 100 is made larger. This makes it possible to raise the functionality of the sensor module 100. Moreover, a welding portion is locally provided to perform welding. This makes it possible to increase a production speed.

Further, the present embodiment makes it possible to weld the front case 11 and the rear case 12 using the first laser light L1, and to weld the rear case 12 and the harness 70 using the second laser light L2, the first laser light L1 and the second laser light L2 being irradiated from the same direction. This makes it possible to efficiently perform welding of the front case 11 and the rear case 12 and welding of the rear case 12 and the harness 70, without the camera unit 110 being turned upside down, or without a change in a location of a laser irradiation source. This results in being able to facilitate the operation. Furthermore, this also makes it possible to form the first welding portion W1 and the second welding portion W2 at the same time or almost at the same time. This results in being able to improve the productivity with respect to the sensor module 100. Moreover, the first welding portion W1 and the second welding portion W2 may be formed sequentially, instead of forming at the same time.

Second Embodiment

Figure 9:
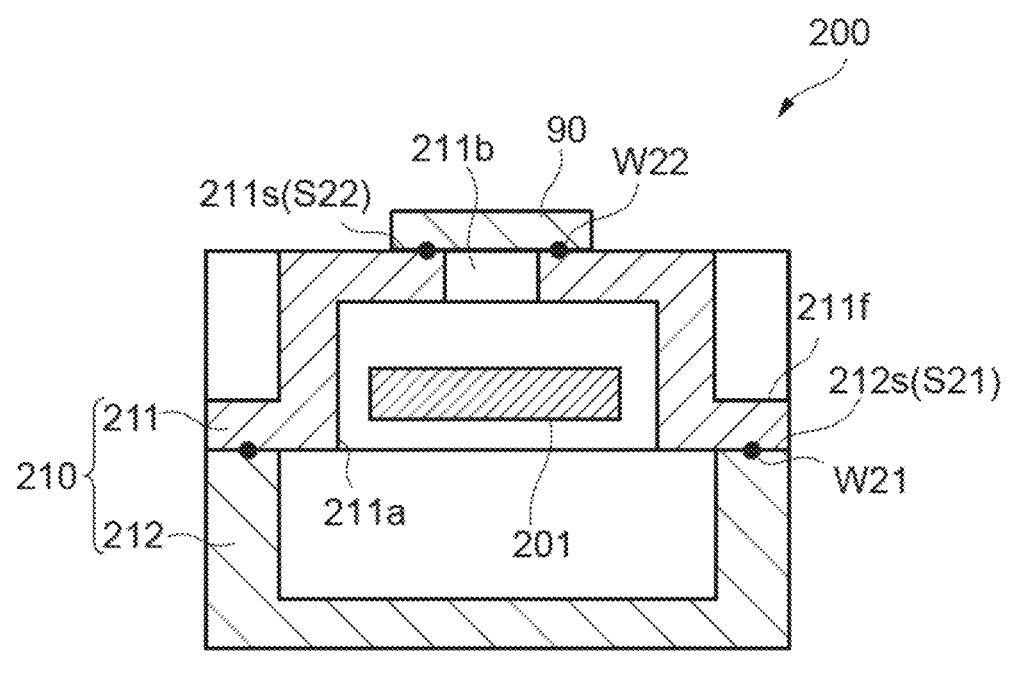
FIG. 9 is a schematic cross-sectional side view illustrating a configuration of a sensor module according to a second embodiment of the present technology.

FIG. 9 is a schematic cross-sectional side view illustrating a configuration of a sensor module 200 according to a second embodiment of the present technology.

The sensor module 200 of the present embodiment is configured as a camera module that includes an imaging device 201, a front case 211, a rear case 212, and a protection cover 90.

The front case 211 is a housing that has a shape of a rectangular parallelepiped or cylinder of which an end (a lower end in the figure) is opened. The front case 211 accommodates therein, for example, the imaging device 201 as a sensor element. The rear case 211 is a box that has a shape of a rectangular parallelepiped or cylinder of which an end (an upper end in the figure) is opened. An opening end 212s of the rear case 211 is joined to a flange 211f that is formed along a peripheral edge of an opening 211a of the front case 211. The rear case 212 is not limited to a box, and may be, for example, a plate material.

The protection cover 90 is a rectangular or circular flat plate that is made of a translucent material through which visible light is transmitted, and covers a through hole 211b that is formed in a front surface portion 211s, in the front case 211, that is situated opposite to the end. The imaging device 201 is accommodated in the front case 211 and includes an imaging surface that images a pencil of light of a subject, the pencil of light of a subject being incident on the imaging surface through the protection cover 90 and the through hole 211b. The imaging device 201 is supported in the front case 211 by use of a support member (not illustrated).

In the sensor module 200 of the present embodiment, the front case 211 and the rear case 212 are joined to each other using laser welding, and the front case 211 and the protection cover 90 are joined to each other using laser welding.

Members that are the front case 211 and the rear case 212 are joined using laser welding, and members that are the front case 211 and the protection cover 90 are joined using laser welding. Thus, the rear case 212 (a first member) is made of a synthetic resin material that has absorptive properties with respect to the first laser light L1, and the protection cover 90 (a second member) has transmissive properties with respect to the second laser light L2 of a wavelength that is different from a wavelength of the first laser light L1. Further, the front case 211 (a third member) is made of a synthetic resin material that has transmissive properties with respect to the first laser light L1 and has absorptive properties with respect to the second laser light L2.

For example, infrared laser light of a wavelength of 1064 nm is used as the first laser light L1, and, for example, green laser light of a wavelength of 532 nm is used as the second laser light L2. It is favorable that the front case 211 be made of a material having a low degree of transmittance (a high degree of absorptance) in an entire range of visible light. This makes it possible to prevent the quality of a captured image from being reduced due to stray light.

The front case 211 includes a first surface S21 that includes a first welding portion W21 that is welded to the rear case 212, and a second surface S22 that includes a second welding portion W22 that is welded to the protection cover 90. The first surface S21 corresponds to an outer surface that is included in the flange 211f and faces the opening end 212s of the rear case 212. The second surface S22 corresponds to the front surface portion 211s facing the protection cover 90.

The first welding portion W21 is provided along a peripheral edge of the flange 211f of the front case 211. The first welding portion W21 is continuously provided along the peripheral edge of the flange 211f. However, without being limited thereto, the first welding portion W21 may be partially (intermittently) provided along the peripheral edge of the flange 211f. The first welding portion W21 is a melt-and-mixture portion of a resin material of the front case 211 and a resin material of the rear case 212 (indicated by a black circle in FIG. 9).

The second welding portion W22 is provided along a peripheral edge of the through hole 211b of the front case 211. The second welding portion W22 is continuously provided along the peripheral edge of the through hole 211b. However, without being limited thereto, the second welding portion W22 may be partially (intermittently) provided along the peripheral edge of the through hole 211b. The second welding portion W22 is a melt-and-mixture portion of a resin material of the protection cover 90 and a resin material of the front case 211 (indicated by a black circle in FIG. 9).

Figure 10:
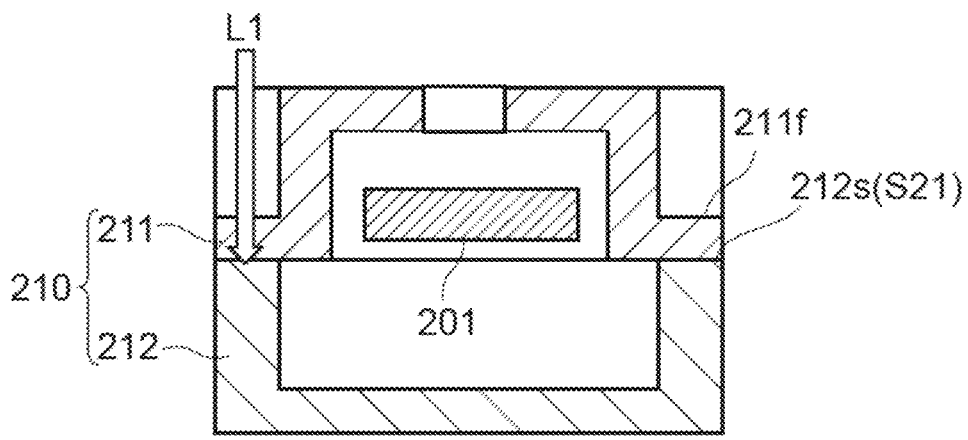
FIG. 10 is a set of schematic cross-sectional side views used to describe a method for producing the sensor module.
Figure 10:
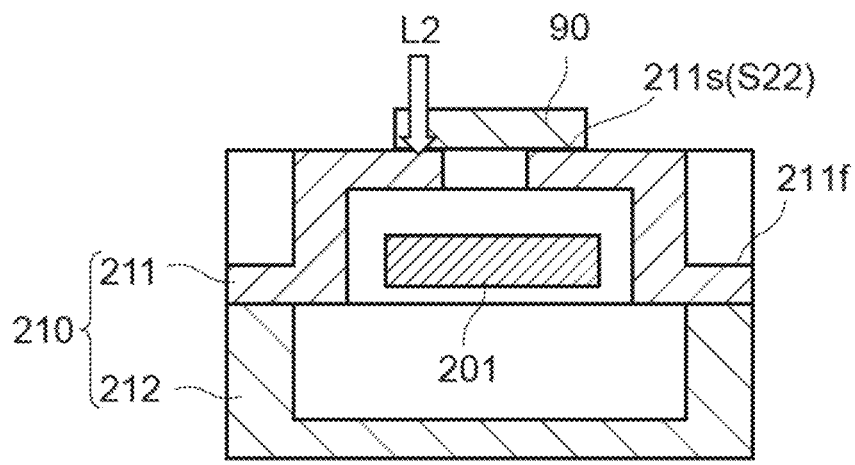
Figure 10:
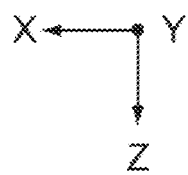

(A) and (B) of FIG. 10 are schematic process diagrams used to describe a method for producing the sensor module 200. The method for producing the sensor module 200 according to the present embodiment includes accommodating a sensor element (the imaging device 201) in the front case 211, joining the flange 211f (the first surface S1) of the front case 211 to the opening end 212s of the rear case 212 using laser welding ((A) of FIG. 10), and joining the protection cover 90 to the front surface portion 211s (the second surface S2) of the front case 211 using laser welding ((B) of FIG. 10).

The first laser light L1 is irradiated toward the opening end 212s of the rear case 212 from a side of a front surface of the sensor module 200 (from a side of the front case 211). The rear case 212 is made of a resin material that has absorptive properties with respect to the first laser light L1, and the front case 211 is made of a resin material that has transmissive properties with respect to the first laser light L1. Thus, the first laser light L1 is transmitted through the flange 211f of the front case 211 to be irradiated onto the opening end 212s of the rear case 212. This results in forming the first welding portion W21 between the flange 211f of the front case 211 and the opening end 212s of the rear case 212, the first welding portion W21 being used to join the flange 211f of the front case 211 and the opening end 212s of the rear case 212 (refer to FIG. 9).

Likewise, the second laser light L1 is irradiated toward the front surface portion 211s of the front case 211 from the side of the front surface of the sensor module 200 (from a side of the protection cover 90). The protection cover 90 is made of a resin material that has transmissive properties with respect to the second laser light L2, and the front case 211 is made of a resin material that has absorptive properties with respect to the second laser light L2. Thus, the second laser light L2 is transmitted through the protection cover 90 to be irradiated onto the front surface portion 211s of the front case 211. This results in forming the second welding portion W22 between the front surface portion 211s of the front case 211 and the protection cover 90, the second welding portion W22 being used to join the front surface portion 211s of the front case 211 and the protection cover 90 (refer to FIG. 9).

As described above, the front case 211 is welded to the rear case 212 and to the protection cover 90 using laser welding. Effects similar to the effects provided according to the first embodiment described above can also be provided according to the present embodiment.

Third Embodiment

Figure 11:
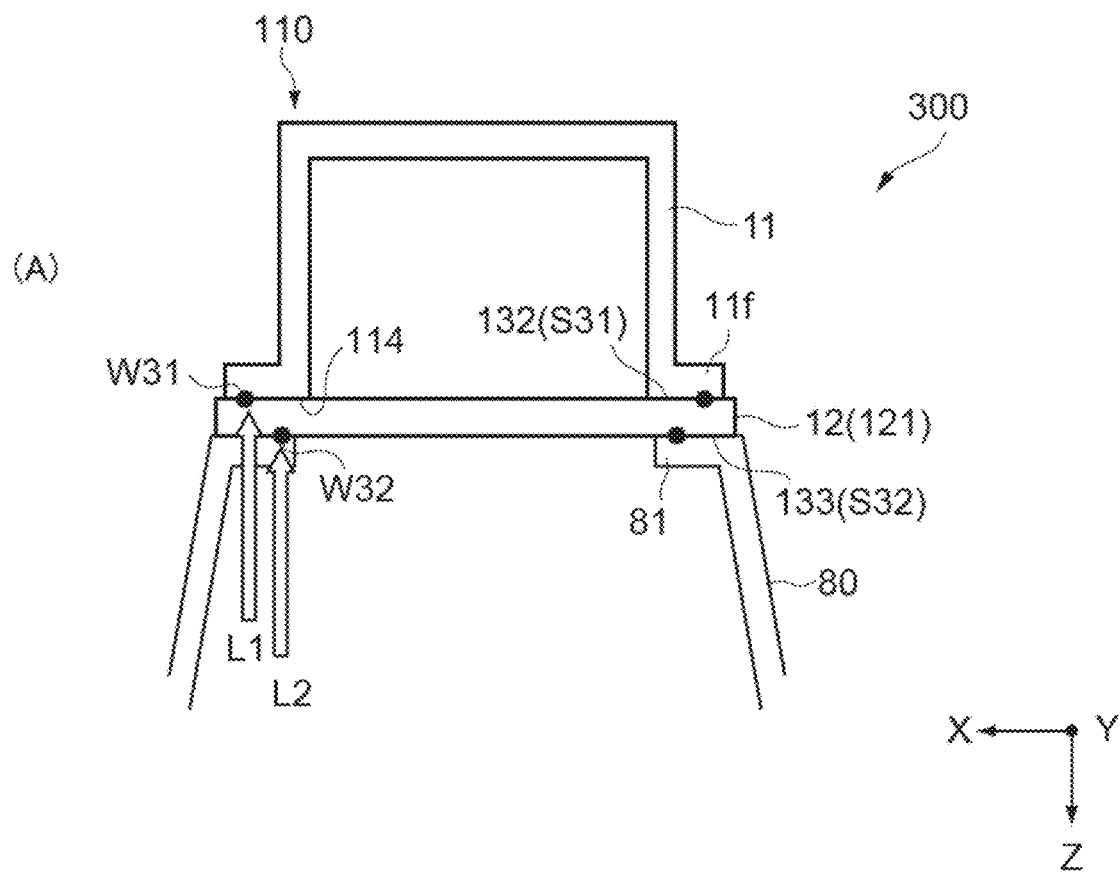
FIG. 11 schematically illustrates a configuration of a sensor module according to a third embodiment of the present technology, where (A) is a cross-sectional side view and (B) is a plan view.
Figure 11:
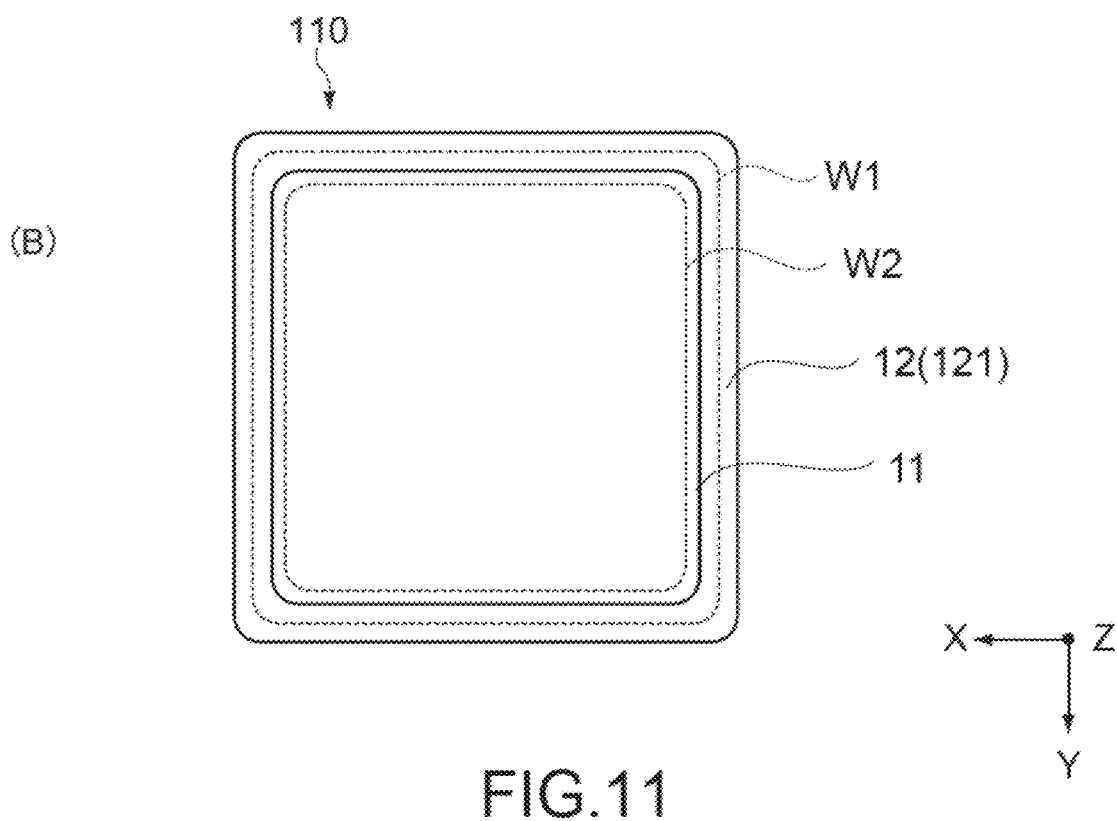

FIG. 11 illustrates a configuration of a sensor module 300 according to a third embodiment of the present technology, where (A) is a schematic cross-sectional side view of the sensor module 300, and (B) is a schematic plan view of the sensor module 300. In the following description, a structural element that is different from the structural elements of the first embodiment is primarily described. A structural element that is similar to the structural element of the first embodiment is denoted by a reference numeral similar to the reference numeral used in the first embodiment, and a description thereof is omitted or simplified.

The sensor module 300 of the present embodiment is different from the first embodiment in that, instead of the harness 70, a bracket 80 is joined to the rear case 12. The bracket 80 corresponds to an attachment member used to fix the camera unit 110 to a vehicle body, and includes an annular support 81 that supports a support surface 133 (a second surface S32) that is situated at a peripheral edge on a back surface of the bottom surface portion 121 of the rear case 12. The bracket 80 is made of a synthetic resin material that has transmissive properties with respect to the first laser light L1 and the second laser light L2.

In the present embodiment, a flange 11*f* that faces a joining surface 132 (a first surface S31) of the rear case 12 is formed over the entirety of the opening end 114 of the front case 11. The flange 11*f* faces the support 81 of the bracket 80 in the direction of the optical axis (the Z axis direction) in a state in which the rear case 12 is situated between the flange 11*f* and the support 81.

The joining surface 132 (the first surface S31) of the rear case 12 includes a first welding portion W31 that is welded to the flange 11*f* of the front case 11. Further, the support surface 133 (the second surface S32) of the rear case 12 includes a second welding portion W32 that is welded to the support 81 of the bracket 80. The first welding portion W31 is annularly formed along a peripheral edge of the joining surface 132 of the rear case 12, and the second welding portion W32 is annularly formed along a peripheral edge of the support 81 of the bracket 80 further inward than the first welding portion W31.

In the present embodiment, the front case 11 (a first member) has absorptive properties with respect to the first laser light L1, and the rear case 12 (a third member) and the bracket 80 (a second member) each have transmissive properties with respect to the first laser light L1. Thus, the first laser light L1 is irradiated toward the joining surface 132 of the rear case 12 from a side of a back surface of the sensor module 300 (from a side of the bracket 80) to form the first welding portion W31 welding the joining surface 132 to the flange 11*f* of the front case 11 (refer to (A) of FIG. 11).

Further, the rear case 12 (the third member) has absorptive properties with respect to the second laser light L2, and the bracket 80 (the second member) has transmissive properties with respect to the second laser light L2. Thus, the second laser light L2 is irradiated toward the support surface 133 of the rear case 12 from the side of the back surface of the sensor module 300 (from the side of the bracket 80) to form the second welding portion W32 welding the support surface 133 to the support 81 of the bracket 80 (refer to (A) of FIG. 11).

Modifications

The technology according to the present disclosure can be applied to various products. For example, the technology according to the present disclosure may be provided as a sensor module that is mounted on one of the types of mobile bodies such as vehicle, electric vehicle, hybrid electric vehicle, motorcycle, bicycle, personal mobility, airplane, drone, ship, robot, construction machinery, and agricultural machinery (tractor).

Further, a camera module has been described as an example of the sensor module 100 in the embodiments above. However, the present technology is not limited thereto. For example, the present technology can also be adopted for a sensor module that includes, as a sensor element, a ranging sensor such as light detection and ranging (LiDAR) or a time-of-flight (ToF) sensor.

Furthermore, the sensor module obtained by three members that are the front case, the rear case, and the harness or the bracket being integrated with each other using laser welding, has been described in the embodiments above. However, the application target is not limited thereto, and the present technology can be applied to casings of various electronic apparatuses, the casing being formed by combining at least three members. Further, the first laser light L1 and the second laser light L2 are not limited to being irradiated from the same direction, and may be irradiated from different directions.

The respective configurations of the sensor module, the front case, the rear case, the sensor board, and the like described with reference to the respective figures are merely embodiments, and any modifications may be made thereto without departing from the spirit of the present technology. In other words, any other configurations for purpose of practicing the present technology may be adopted.

Note that the present technology may also take the following configurations.

(1) A sensor module, including:
a first member that is made of a synthetic resin material that has absorptive properties with respect to first laser light;
a second member that is made of a synthetic resin material that has transmissive properties with respect to second laser light of a wavelength that is different from a wavelength of the first laser light;
a third member that is made of a synthetic resin material that has transmissive properties with respect to the first laser light and has absorptive properties with respect to the second laser light, the third member including a first surface and a second surface, the first surface including a first welding portion that is welded to the first member, the second surface including a second welding portion that is welded to the second member; and
a sensor element that is accommodated between the first member and the second member.

(2) The sensor module according to (1), in which
the first welding portion is provided along a peripheral edge of the first surface, and
the second welding portion is provided along a peripheral edge of the second surface.

(3) The sensor module according to (2), in which
the first welding portion is continuously provided along the peripheral edge of the first surface, or the second welding portion is continuously provided along the peripheral edge of the second surface.
(4) The sensor module according to (2), in which
the first welding portion is partially provided along the peripheral edge of the first surface, or
the second welding portion is partially provided along the peripheral edge of the second surface.
(5) The sensor module according to any one of (1) to (4), in which
the first member is a front case that accommodates therein the sensor element,
the second member is a harness that includes a cable that is electrically connected to the sensor element, and
the third member is a rear case that is connected between the front case and the harness.
(6) The sensor module according to any one of (1) to (4), in which
the first member is a front case that accommodates therein the sensor element,
the second member is a bracket used to fix the front case to a vehicle body, and
the third member is a rear case that is connected between the front case and the bracket.
(7) The sensor module according to any one of (1) to (4), in which
the third member is a front case that accommodates therein the sensor element, the front case including an opening at an end of the front case, and a through hole that is situated opposite to the end,
the first member is a rear case that is joined to the opening, and
the second member is a translucent protection cover that covers the through hole.
(8) The sensor module according to any one of (1) to (7), in which
the sensor element is an imaging device.
(9) The sensor module according to any one of (1) to (7), in which
the sensor element is a ranging sensor.
(10) The sensor module according to any one of (1) to (9), in which
the first laser light is laser light of a wavelength in an infrared band, and
the second laser light is laser light of a wavelength in a green band.

REFERENCE SIGNS LIST

11, 211 front case
12, 212 rear case
20 sensor board
22, 201 imaging device
70 harness
80 bracket
90 protection cover
100, 200, 300 sensor module
110 camera unit
113 opening
114 opening end
L1 first laser light
L2 second laser light
S1, S21, S31 first surface
S2, S22, S32 second surface
W1, W21, W31 first welding portion
W2, W22, W32 second welding portion

The invention claimed is:
1. A sensor module, comprising:
a first member that is made of a synthetic resin material that has absorptive properties with respect to first laser light;
a second member that is made of a synthetic resin material that has transmissive properties with respect to second laser light of a wavelength that is different from a wavelength of the first laser light;
a third member that is made of a synthetic resin material that has transmissive properties with respect to the first laser light and has absorptive properties with respect to the second laser light, the third member including a first surface and a second surface, the first surface including a first welding portion that is welded to the first member, the second surface including a second welding portion that is welded to the second member; and
a sensor element that is accommodated between the first member and the second member.
2. The sensor module according to claim 1, wherein
the first welding portion is provided along a peripheral edge of the first surface, and
the second welding portion is provided along a peripheral edge of the second surface.
3. The sensor module according to claim 2, wherein
the first welding portion is continuously provided along the peripheral edge of the first surface, or
the second welding portion is continuously provided along the peripheral edge of the second surface.
4. The sensor module according to claim 2, wherein
the first welding portion is partially provided along the peripheral edge of the first surface, or
the second welding portion is partially provided along the peripheral edge of the second surface.
5. The sensor module according to claim 1, wherein
the first member is a front case that accommodates therein the sensor element,
the second member is a harness that includes a cable that is electrically connected to the sensor element, and
the third member is a rear case that is connected between the front case and the harness.
6. The sensor module according to claim 1, wherein
the first member is a front case that accommodates therein the sensor element,
the second member is a bracket used to fix the front case to a vehicle body, and
the third member is a rear case that is connected between the front case and the bracket.
7. The sensor module according to claim 1, wherein
the third member is a front case that accommodates therein the sensor element, the front case including an opening at an end of the front case, and a through hole that is situated opposite to the end,
the first member is a rear case that is joined to the opening, and
the second member is a translucent protection cover that covers the through hole.
8. The sensor module according to claim 1, wherein
the sensor element is an imaging device.
9. The sensor module according to claim 1, wherein
the sensor element is a ranging sensor.
10. The sensor module according to claim 1, wherein
the first laser light is laser light of a wavelength in an infrared band, and
the second laser light is laser light of a wavelength in a green band.

* * * * *